United States Patent [19]
Bacon

[11] Patent Number: 5,185,049
[45] Date of Patent: Feb. 9, 1993

[54] APPARATUS FOR WELDING TOGETHER DUAL CONTAINMENT PIPE SECTIONS

[75] Inventor: Robert H. Bacon, Timonium, Md.

[73] Assignee: Midwesco, Inc., Niles, Ill.

[21] Appl. No.: 704,409

[22] Filed: May 23, 1991

[51] Int. Cl.⁵ .............................................. B29C 65/20
[52] U.S. Cl. .............................. 156/304.2; 156/304.6; 156/499; 156/503; 285/138
[58] Field of Search ................. 156/158, 304.2, 304.6, 156/499, 503; 285/138; 254/134.3 R

[56] References Cited

U.S. PATENT DOCUMENTS

| | | | |
|---|---|---|---|
| 240,236 | 4/1881 | Delany | 254/134.3 R |
| 2,972,371 | 2/1961 | Hermann et al. | 156/499 |
| 3,013,925 | 12/1961 | Larsen | 156/304.6 |
| 3,391,045 | 7/1968 | Mojonnier et al. | 156/304.6 |
| 3,727,289 | 4/1973 | Bemelmann et al. | 156/503 |
| 4,786,088 | 11/1988 | Ziu | 285/138 |
| 4,797,621 | 1/1989 | Anderson et al. | 73/40.5 R |
| 5,018,260 | 5/1991 | Ziu | 285/138 |

Primary Examiner—Michael W. Ball
Assistant Examiner—Steven D. Maki
Attorney, Agent, or Firm—Mason, Kolehmainen, Rathburn & Wyss

[57] ABSTRACT

A new and improved method and apparatus is provided for welding together abutting end faces of adjacent dual containment pipe sections of the type described while an elongated flexible cable is present and extending between the adjacent pipe sections. The apparatus includes a unique heater element having opposed heating surfaces and openings formed along diametrically disposed confronting edges for accommodating an elongated cable element so that the pipe sections can be welded together while the cable element is in place.

10 Claims, 2 Drawing Sheets

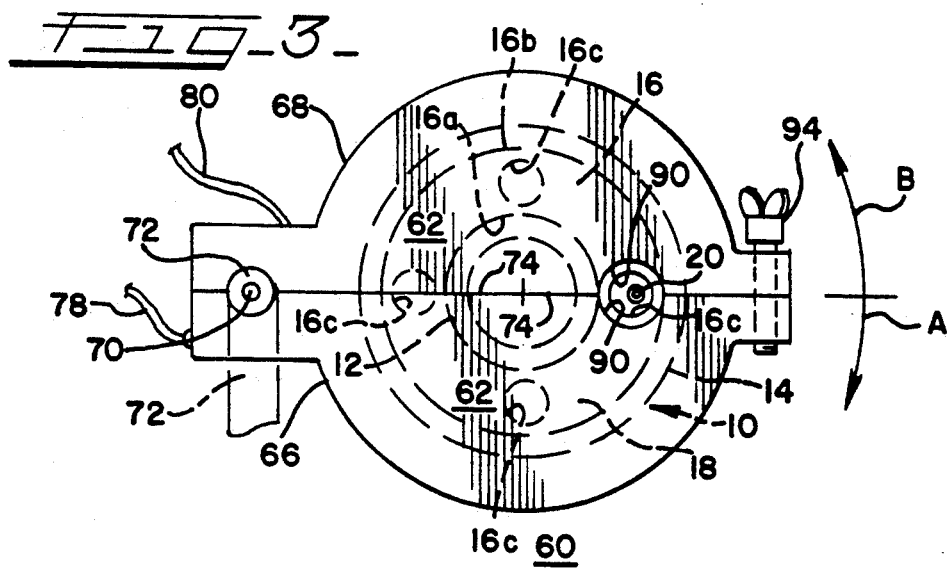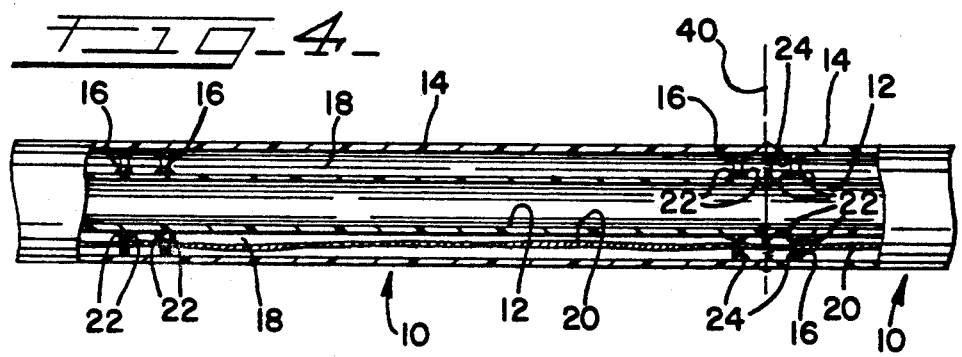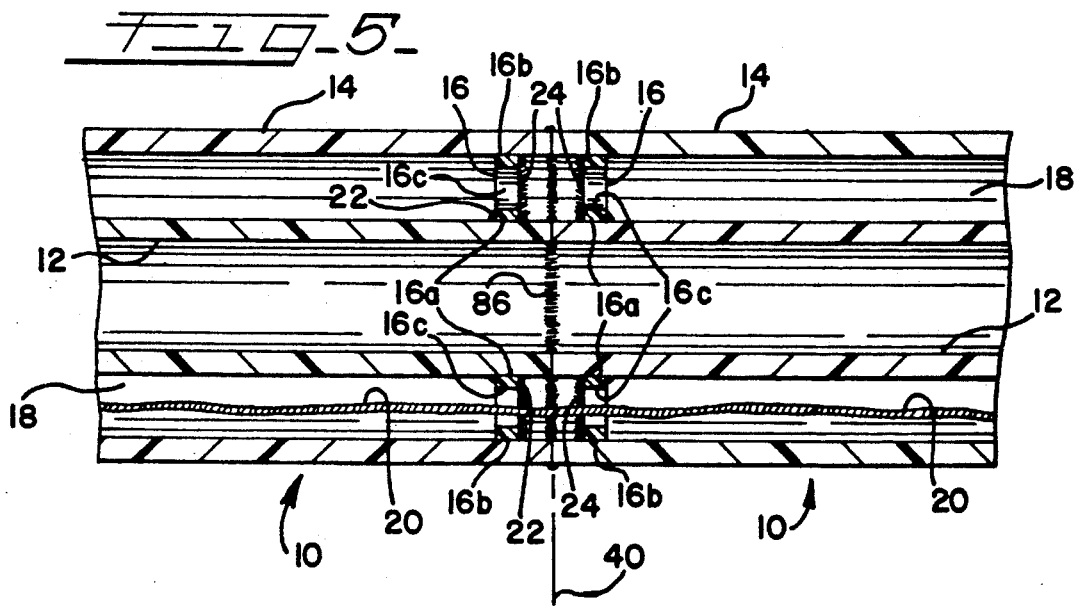

APPARATUS FOR WELDING TOGETHER DUAL CONTAINMENT PIPE SECTIONS

BACKGROUND OF THE INVENTION

1. Field of the Invention

The present invention relates to a new and improved welding apparatus and process for joining together dual containment pipe sections in end to end relationship while a cable is maintained in place extending between the pipe sections. A novel welding apparatus is provided for performing these welds while the elongated cable is retained in extended position between the pipe sections as the weld takes place.

2. Background of the Prior Art

U.S. Pat. No. 4,786,088 is directed to a double containment, thermoplastic pipe assembly utilizing snap-in-place, C-shaped spacing elements between an inner carrier and an outer containment pipe section in concentric relation therewith.

OBJECTS OF THE INVENTION

It is an important object of the invention to provide a new and improved apparatus for welding together adjacent pipe sections and/or components in a dual fluid containment system while an elongated detection cable or the like is retained in place extending between the pipe sections and components being joined by the welding process.

BRIEF SUMMARY OF THE PRESENT

The foregoing and other objects and advantages of the present invention are accomplished in a new and improved apparatus in accordance with the present invention especially adapted for welding together adjacent fluid containment pipe sections and/or components or fittings while maintained in coaxial end to end relation. The weld is accomplished while a flexible detection cable is in place extending between the adjacent sections being welded together. The welding system employs a novel heating element or mirror formed by a pair of semi-cylindrical elements having opposite parallel heating surfaces, each formed with an access opening along a diametrical edge for accommodating the cable extending between adjacent sections while the adjacent end faces of the conduit sections are heated in preparation for welding.

BRIEF DESCRIPTION OF THE DRAWINGS

For a better understanding of the present invention, reference should be had to the following detailed description taken in conjunction with the drawings, in which:

FIG. 3 is a transverse cross-sectional view taken substantially along lines 3—3 of FIG. 1;

FIG. 4 is a fragmentary longitudinal crosssectional view of a pair of pipe sections of the fluid containment system of the present invention after they have been welded together; and FIG. 5 is an enlarged fragmentary longitudinal crosssectional view similar to FIG. 4 illustrating welded together pipe sections adjacent a flash butt welded joint between the sections.

DETAILED DESCRIPTION OF A PREFERRED EMBODIMENT OF THE INVENTION

Figure 1:
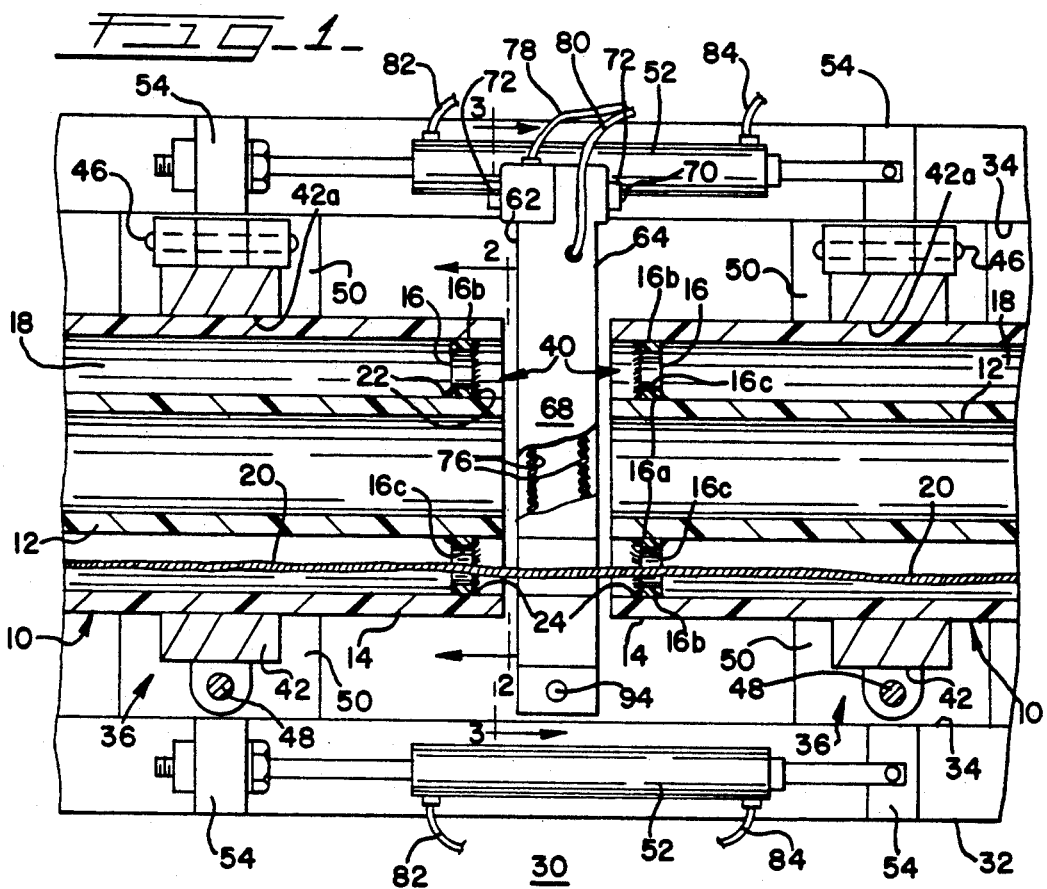
FIG. 1 is a longitudinally extending crosssectional view of a pair of pipe sections of a fluid containment system shown in position ready for welding in a new and improved welding apparatus, constructed in accordance with the invention.

Referring now more particularly to the drawings, therein is illustrated a new and improved fluid containment system embodied in a plurality of elongated pipe sections generally indicated by the reference numeral 10 and adapted to be butt fusion welded together in end-to-end relationship as best disclosed in FIGS. 4 and 5. The pipe sections are welded together to provide a continuous inner fluid carrier conduit 12 and are formed of resinous thermoplastic material such as polypropylene, polyethylene, polyvinylchloride (PVC) and other types of thermoplastic materials which can be permanently joined or welded together.

Normally such welding is accomplished by the application of heat and pressure in a welding process known as butt fusion welding, or in an extrusion welding process and/or a hot air welding process. A particular type of resin such as, for example, polyvinylydenefluoride (PVDF) may be chosen in order to accommodate a particular type of fluid in the form of liquid or gas which is to be carried along the inner fluid carrier conduit 12 under desired temperature and pressure conditions selected for a particular application.

In general, the pipe resin that is chosen is selected for a particular fluid to be carried by means of reference to federal, state and local regulations and laws which are pertinent and reference is also had to the resin manufacturer's tables and specifications which set forth the strength, heat, chemical capability and a life expectancy required for a particular application such as, for example, pharmaceutical drains, animal waste disposal systems, chemical assembly processes, and the like, which are often controlled by both state and federal environmental protection agencies. In general, an inner carrier pipe 12 of a selected resin material is formed in an extrusion process and is cut to appropriate lengths, for example, approximately 15 feet for ease in handling and fabrication into large systems of considerable length. The inner and outer diameter size and accordingly the wall thickness of the conduits is chosen for accommodating the desired fluid flow rate, pressure and temperature conditions that are to be maintained in a carrier conduit 12 when formed of welded together end-to-end pipe sections 10.

In order to avoid environmental contamination should a leak arise permitting the escape of fluid from the inner carrier conduit 12, each pipe section 10 of the containment system employs an outer fluid containment conduit 14 secured in coaxial concentric relation to the inner carrier fluid conduit 12 by means of a plurality of annular spacers 16 extending radially between the inner and outer conduits 12 and 14 as best shown in FIGS. 1 and 5. An annular leakage containment space 18 is then formed around the inner fluid carrier conduit 12 to collect and retain any fluid leakage from faults in the inner carrier conduit. As more fully set forth in U.S. Pat. No. 4,797,621, assigned to the same assignee as the present application and incorporated herein by reference, electronic systems have been developed for detecting and locating fluid leakages by sensing the presence of fluid in the leakage containment space 18 and for this purpose, elongated detection and control cables 20 may be extended between adjacent pipe sections 10.

Lengths of cable are normally furnished with each pipe section 10 and both the cables 20 and the pipe sections are connected together on site while respective pipe sections 10 are being butt fusion welded together in end-to-end relation to form a complete fluid handling system with leakage containment provisions in accordance with the present invention.

By furnishing a length of detection cable or other electrical cable 20 slightly longer than a pipe section 10 along with each pipe section, the cumbersome task of feeding or threading a flexible cable 20 between openings in the radial spacers 16 in the containment space 18 is eliminated. The cable 20 furnished in each pipe section 10 is put in place during fabrication of the pipe section at the factory and then the cables 20 in these pipe sections are electrically interconnected on site just before two pipe sections 10 are welded together into permanent position.

The pipe sections 10 are designed to carry a wide variety of different fluids and to provide leak containment protection for the environment surrounding the system, and accordingly, the inner carrier fluid conduit 12 and the outer fluid containment conduit 14 of each pipe section 10 are securely interconnected together by means of the circular spacers 16. The spacers are formed of thermoplastic material compatible with the material of the inner and outer fluid conduits so that the spacers can be fastened in place by welding. As illustrated in FIG. 4, the radial spacers 16 are spaced closely together in pairs, and the pairs are spaced at appropriate intervals intermediate the opposite end faces of each pipe section 10. A single spacer 16 is provided at the end of each pipe section and this spacer is closely adjacent to, but inwardly of, an outer end face of the pipe section 10 that is normal to the longitudinal axis of the pipe section.

Figure 2:
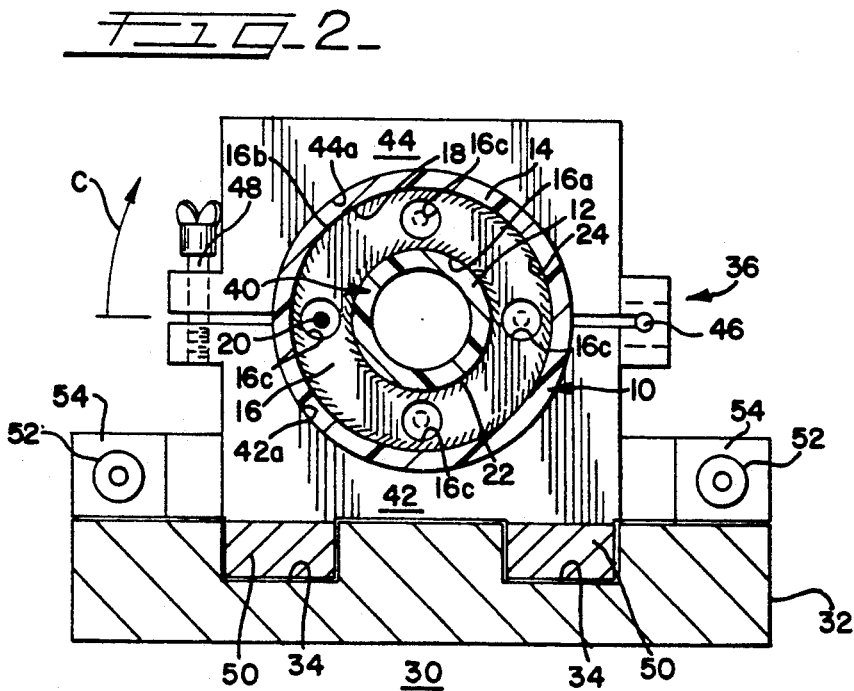
FIG. 2 is a transverse cross-sectional view taken substantially along lines 2—2 of FIG. 1.

In accordance with the present invention, pairs of elongated pipe sections 10 of the containment system are butt fusion welded in end-to-end relation in a new and improved welding apparatus 30 as shown in FIGS. 1, 2 and 3. The apparatus 30 includes a base 32 having a pair of parallel spaced apart elongated guideways or tracks 34 defined therein for supporting a pair of mobile clamping assemblies 36 movable longitudinally of the ways 34 to clamp, hold and concentrically align a pair of respective left and right hand pipe sections 10. When a pair of pipe sections 10 are clamped by the assemblies 36, concentric alignment is maintained and movement along the ways 34 is effective to force normal end faces 40 of the pipe sections 10 toward one another after sufficient heating to establish a butt fusion welding process.

Each clamping assembly includes a lower jaw 42 and an upper jaw 44 pivotally interconnected by a pivot pin 46 so that the jaws may be opened and closed relative to one another to release and hold an end portion of the pipe section 10. Each jaw 42 or 44 is provided with a respective semi-cylindrical clamping surface 42a or 44a (FIG. 2) for engaging and holding the outer surface (OD) of the outer containment fluid conduit 14 of a pipe section 10 closely adjacent to the normal end face 40 thereof which is to be welded. A clamping screw 48 is provided to secure each pair of upper and lower jaws 42 and 44 in a tightly clamped position to clamp and hold the pipe sections 10 during the welding process. Each lower jaw 42 is provided with a pair of supporting feet 50 adapted to slide longitudinally of the base 32 along the parallel guideways 34 when longitudinal movement of the pipe sections 10 is initiated during a weld. Movement of the respective clamping assemblies 36 toward and away from one another may be accomplished by one or more hydraulic fluid cylinders 52 interconnected to the respective clamping assemblies 36 as shown in FIG. 1 through ears or projections 54 extending laterally outwardly of the jaws 42.

In accordance with the present invention, the confronting adjacent end faces 40 of a pair of respective pipe sections 10 are heated to a desired fusion temperature for the material of the fluid conduits 12 and 14 by means of a unique heating assembly 60 (FIGS. 1 and 3) commonly known and referred to as a mirror.

The heating assembly 60 includes a pair of circular, opposed heating surfaces 62 and 64 on opposite sides facing respective butt ends 40 of left hand and right hand pipe sections 10 as shown in FIG. 1. Each heating surface 62 and 64 is substantially planar to closely abut and to heat by conductive contact the adjacent end surface 40 of a pipe section 10 so that the material of the inner carrier conduit 12 and the outer containment conduit 14 is raised to an elevated fusion temperature ready for welding. As illustrated in FIGS. 1 and 3, the heating surfaces 62 and 64 are formed by opposite side faces of a pair of semi-cylindrical members 66 and 68 which are pivotal relative to one another about a pivot axle 70 extending parallel of the longitudinal axis of the pipe sections 10. Preferably, the pivot axle 70 is supported from the base 32 on a pair of upstanding brackets 72 at opposite ends of the pivot pin so that the lower member 66 may be pivoted downwardly in a clockwise direction as shown by the arrow "A" in FIG. 3 while the upper half section 68 is pivoted upwardly in a counterclockwise direction as shown by the arrow "B" until both half sections 66 and 68 are spaced outwardly and clear of confronting relation with the opposite end faces 40 of the respective left and right hand pipe sections 10.

The lower half member 66 and upper half member 68 are adapted to abut together along a diametrical plane 74 to form a heating mirror having opposed, circular-shaped planar heating faces 62 and 64 when the upper and lower members 68 and 66 are closed together in the pipe heating position shown in FIG. 3. The planar faces 62 and 64 of the respective lower and upper half members 66 and 68 are heated from the inside of the structure by electric resistance heating coils or elements 76 and these coils are supplied with electrical energy through flexible lead lines 78 and 80 running to the respective lower and upper half members 66 and 68.

The amount of electrical energy supplied to the resistance heaters 76 is carefully controlled to elevate the surface temperature of the respective planar faces 62 and 64 to a selected temperature level for softening the end faces 40 of the respective pipe sections 10 to a desired consistency in preparation for welding and upset. After the critical temperature has been achieved for a particular resin material of the pipe sections 10, the respective upper and lower half members 68 and 66 are pivoted away from one another in opposite directions as indicated by the arrows "A" and "B" and the fluid cylinders 52 are pressurized appropriately through fluid lines 82 and 84 to rapidly move one of the left hand and right hand clamping assemblies 36 and the respective pipe sections 10 toward one another so that the heated, softened end faces 40 of the pipe sections will contact one another under sufficient pressure and elevated temperature to weld together in a high quality, annular, butt fusion weld as indicated by the reference numeral 86 in FIG. 5.

The amount of force exerted by the respective hydraulic cylinders 52 is carefully selected to be appropriate for the particular plastic material involved and the particular thicknesses of the conduit wall sections to insure that a high quality butt fusion weld 86 is achieved. Similarly, the heating temperature attained by the circular, mirror-like heating faces 62 and 64 is selected so that the particular thermoplastic material of the pipe sections 10 is softened to the desired consistency ready for welding when the increased butt fusion welding pressure is attained and held for a selected time period. After the upset weld 86 is formed, the material is cooled and a solid, butt fusion welded upset ring 86 is established. The end faces 40 of the inner carrier conduits and the outer containment conduits 14 of the respective left and right hand pipe sections 10 thus become permanently connected.

In accordance with an important feature of the present invention, the confronting diametrical edges 74 of the respective lower and upper half members 66 and 68 of the heating assembly 60 are each formed with cooperative openings of generally semi-cylindrical shape as indicated by the reference numerals 90 in FIG. 3. The openings 90 on each half member 66 and 68 are designed to cooperate and form a single large opening of cylindrical shape at a point along the diametrical joint line 74 spaced outwardly from the central axis of the respective pipe sections 10 as shown in FIG. 3. The cooperating openings 90 formed by half members 66 and 68 in a fully closed position are adapted to accommodate an elongated flexible cable 20 extending between the opposite left and right pipe sections 10 while the heating process and the weld upset 86 is formed. The unique construction of the half members 66 and 68 of the heating assembly 60 and particularly the cooperating openings 90 along the diametrical plane 74 permits the cable 20 to remain in place extended between the right and left pipe sections 10 while the heating and upset welding process takes place.

In accordance with the invention, each annular spacer 16 is formed with a plurality of equilaterally spaced apart through-passages or openings 16c spaced between the inner edge 16a and the outer edge 16b so that the cables 20 may extend between and through the individual spacers 16 and the closely spaced sets of spacers 16 in each pipe section 10. Similarly, the cable 20 can easily extend between adjacent end spacers 16 on a pair of pipe sections 10 that are butt fusion welded together in end-to-end relation. By providing a plurality of openings 16c, the detection cable 20 can always be aligned in a position spaced below or beneath the level of the inner, carrier fluid conduit 12 in a variety of different rotational orientations of the respective pipe section 10 as a whole.

Generally, electrical connections are made between ends of the cables 20 in respective pipe sections 10 while the confronting end faces 40 are spaced some distance apart as shown in FIG. 1 and before the respective half members 66 and 68 of the heating and welding assembly 60 are closed together as shown in FIG. 3. After the electrical connections between two cable sections 20 are made, the half members 66 and 68 are closed together and the diametrical surfaces 74 are locked in contact by means of a suitable lock pin 94. When locked together, a pair of planar, circular heating surfaces 62 and 64 opposing the respective end faces 40 of the left and right hand pipe sections 10 are provided and the spliced together cable sections 20 pass through the openings 90. After closing the half members 66 and 68 with the cable 20 in placed, the pipe sections 10 are moved toward one another until the end faces 40 engage the respective mirror-like heating surfaces 62 and 64. Electrical energy is supplied to the coils 76 to heat the surfaces 62 and 64 via the flexible cables 78 and 80.

When the desired temperature level has been reached, the lock mechanism 94 between the half members 66 and 68 is released and the heating elements are pivoted away from one another as indicated by the arrows "A" and "B" about the pivot pin 70 so that the area between the respective end faces 40 of the left and right hand pipe sections 10 is clear.

The cylinders 52 are then rapidly actuated to draw the heated end faces 40 of the respective pipe sections 10 into forced contact so that the softened and heated plastic material thereof will knit and weld together to form the upset weld bead 86 and simultaneously provide a high quality, annular-shaped fusion butt weld on both conduits 12 and 14 of the adjacent pipe sections 10. The longitudinally applied welding pressure between the end faces 40 of the respective left and right hand pipe section 10 is maintained for a selected period of time after initial contact and is retained between the end faces until the weld material has cooled and solidifies sufficiently. The clamping elements 42 and 44 of each pipe clamp assembly 36 are then opened up by release of the clamp screws 48 and upward pivotal movement of the upper clamp members 44 in a clockwise direction as indicated by the arrow "C" in FIG. 2. The welded together left and right hand pipe sections 10 can then be moved longitudinally until an end face 40 of a completed string of welded together pipe sections 10 and a new individual pipe section 10 to be added to the string are in confronting relation on opposite sides of the heat mirror 60 as shown in FIG. 1, ready for the next welding cycle to take place.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for joining together abutting end faces of a pair of adjacent pipe sections end to end in a fluid containment system, each pipe section comprising an outer safety containment conduit mounted in outwardly surrounding, spaced apart concentric relation around an inner carrier conduit for containing any fluid leakage therefrom, at least one spacer extending between said inner carrier conduit and said outer containment conduit to define an annular containment space around said inner carrier conduit, said inner and outer conduits of each pipe section having coplanar end faces at opposite ends of said pipe section, and an elongated cable element in said containment pace, said cable elements in each of said adjacent pipe sections adapted to be interconnected together when said adjacent pair of pipe sections are joined together end to end to provide a continuous cable element extending along a string of end to end welded together pipe sections, said continuous cable element adapted for detecting the presence of leakage fluid from said inner carrier conduit in said containment space along said string of pipe sections, said apparatus comprising:

clamping means for securing each one of said pair of said adjacent pipe sections with coplanar end faces of both said inner and outer conduits of each pipe section in coaxial alignment with the other ready for linear movement along a common axis toward and away from one another; and heater means having a pair of oppositely facing parallel heating surfaces for simultaneously heating said end faces of said inner and outer conduits of each of said respective adjacent pipe sections to a welding temperature;

each of said oppositely facing heating surfaces formed by a pair of heating members pivotally interconnected at a point spaced away from said common axis and pivotal to open and close together into a heating position extending transversely of said pair of adjacent pipe sections between said end faces of said inner and outer conduits of each pipe section, said closed together heating members forming a pair of oppositely facing continuous planar parallel heating surfaces for contact heating of both of said pipe sections, said heating members pivotable, to move apart out of said heating position to a retracted position clear of said pair of adjacent pipe sections for permitting said clamping means to relatively move said adjacent pipe sections toward one another to weld said heated end faces together; and each of said heating members having a joint edge confronting a joint edge of the other member when said members are closed together in said heating position forming said continuous planar heating surface, at least one of said joint edges having an opening formed radially outwardly of said common axis of said pair of adjacent pipe sections and facing an opening in the joint edge in the other heating member when said heating members are closed together in said heating position, said joint edge openings positioned to be aligned in communication with the containment space of each of said pairs of adjacent pipe sections forming a passage through said closed together heating members for passing said cable element of at least one of said pair of adjacent pipe sections between said opposed heating surfaces abutting said end faces of said inner and outer conduits of said pair of adjacent pipe sections while said heating and welding thereof takes place.

2. The apparatus of claim 1, wherein:
said heating members together form a cylindrical shape in said closed heating position and said edges thereof comprise a diametrical plane of said cylindrical shape.

3. The apparatus of claim 2, wherein: said passage formed by said edge openings of
said heating members in said closed position is spaced outwardly of sad inner conduits of said respective adjacent end to end pipe sections.

4. The apparatus of claim 3, wherein:
said passage is cylindrical in shape and intersects said continuous planar heating surfaces at a right angle.

5. The apparatus of claim 3, wherein:
said passage is spaced inwardly of said outer conduits of said respective adjacent end to end pipe sections.

6. A method of welding together into a string abutting end faces of a pair of adjacent pipe sections of a fluid containment system, each pipe section comprising an outer safety containment conduit formed of heat weldable material in outwardly surrounding, spaced apart coaxial relation around an inner carrier conduit forming an annular containment space around said inner carrier conduit for containing any fluid leakage therefrom, at least one spacer extending between said inner carrier conduit and said outer containment conduit, to maintain said annular containment space between said conduits, said inner and outer conduits having coplanar end faces at opposite ends of said pipe section, and an elongated cable element extending between said containment spaces of said adjacent end to end pipe sections, said method including the steps of:

holding said adjacent pipe sections in end to end relationship with said end faces in coaxial alignment on a common axis for movement toward and away from one another;

simultaneously heating said end faces of said respective end to end pipe sections to a suitable welding temperature while said cable element is present and extends between said containment sections of said respective end to end pipe section; and moving said respective pipe sections along said common axis toward one another into direct end to end contact to weld said heated end faces together.

7. The method of claim 6, wherein:
said end faces are simultaneously heated by contact with a pair of oppositely facing, parallel continuous planar heating surfaces out of contact with said cable element.

8. The method of claim 7, wherein:
said continuous planar heating surfaces are formed by joining together a pair of heating elements along a common joint line on an edge of said elements.

9. The method of claim 8, wherein:
said cable element is extended between said continuous planar heated surfaces through a passage formed by an opening on said at least one common edge of a heating element.

10. The method of claim 6, including the steps of:
holding said end faces of said adjacent end to end pipe sections together under pressure until said material thereof solidifies to complete a welded joint.

* * * * *